(12) United States Patent
Kim et al.

(10) Patent No.: US 11,960,996 B2
(45) Date of Patent: Apr. 16, 2024

(54) VIDEO QUALITY ASSESSMENT METHOD AND APPARATUS

(71) Applicant: SAMSUNG ELECTRONICS CO., LTD., Suwon-si (KR)

(72) Inventors: Namuk Kim, Suwon-si (KR); Anant Baijal, Suwon-si (KR); Jayoon Koo, Suwon-si (KR); Ilhyun Cho, Suwon-si (KR); Cheulhee Hahm, Suwon-si (KR); Wookhyung Kim, Suwon-si (KR); Keuntek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 507 days.

(21) Appl. No.: 17/364,157

(22) Filed: Jun. 30, 2021

(65) Prior Publication Data
US 2022/0101123 A1 Mar. 31, 2022

(30) Foreign Application Priority Data
Sep. 29, 2020 (KR) .......................... 10-2020-0127542

(51) Int. Cl.
*G06N 3/08* (2023.01)
*G06F 18/20* (2023.01)
(Continued)

(52) U.S. Cl.
CPC .......... *G06N 3/08* (2013.01); *G06F 18/2113* (2023.01); *G06F 18/285* (2023.01); *G06N 3/045* (2023.01); *G06T 7/20* (2013.01)

(58) Field of Classification Search
CPC . G06N 3/08; G06N 3/045; G06N 3/04; G06F 18/2113; G06F 18/285; G06T 7/20;
(Continued)

(56) References Cited

U.S. PATENT DOCUMENTS 9,734,567 B2   8/2017   Zhang et al.
9,741,107 B2   8/2017   Xu et al.
(Continued)

FOREIGN PATENT DOCUMENTS

KR   10-2020-0110255 A   9/2020

OTHER PUBLICATIONS

Le Callet P, Viard-Gaudin C, Barba D. A convolutional neural network approach for objective video quality assessment. IEEE transactions on neural networks. Sep. 6, 2006;17(5):1316-27. (Year: 2006).*
(Continued)

*Primary Examiner* — Fayyaz Alam
(74) *Attorney, Agent, or Firm* — Sughrue Mion, PLLC

(57) ABSTRACT

An operating method of a computing apparatus is provided. The operating method of the computing apparatus includes obtaining a reference image; obtaining a distorted image generated from a reference image; obtaining an objective quality assessment score of a distorted image that is indicative of a quality of a distorted image as assessed by an algorithm, by using a reference image and a distorted image; obtaining a subjective quality assessment score corresponding to a objective quality assessment score; and training a neural network, by using a distorted image and a subjective quality assessment score as a training data set.

19 Claims, 13 Drawing Sheets

(51) Int. Cl.
*G06F 18/2113* (2023.01)
*G06N 3/045* (2023.01)
*G06T 7/20* (2017.01)

(58) Field of Classification Search
CPC ............. G06T 5/00; G06T 2207/20081; G06T 2207/20084; G06T 2207/30168; G06T 7/0002; G06V 10/993; G06V 20/40; H04N 17/02
See application file for complete search history.

(56) References Cited

U.S. PATENT DOCUMENTS

| | | | |
|---|---|---|---|
| 9,996,768 B2 | 6/2018 | Shen et al. | |
| 10,607,326 B2 | 3/2020 | Medasani et al. | |
| 2016/0379352 A1* | 12/2016 | Zhang | G06N 3/045 382/157 |
| 2017/0347159 A1* | 11/2017 | Baik | G06N 5/01 |
| 2018/0286032 A1* | 10/2018 | Bovik | G06T 7/0002 |
| 2018/0300869 A1 | 10/2018 | Aaron et al. | |
| 2019/0108627 A1* | 4/2019 | Medasani | G06T 5/50 |
| 2019/0370608 A1 | 12/2019 | Lee et al. | |
| 2020/0234141 A1 | 7/2020 | Wang et al. | |
| 2021/0295096 A1* | 9/2021 | Vu | G06V 10/774 |
| 2022/0051382 A1* | 2/2022 | Chen | H04N 21/4662 |
| 2022/0180625 A1* | 6/2022 | Ahn | G06V 10/82 |

OTHER PUBLICATIONS

Krasula L, Baveye Y, Le Callet P. Training objective image and video quality estimators using multiple databases. IEEE Transactions on Multimedia. Aug. 15, 2019;22(4):961-9. (Year: 2019).*

Chikkerur S, Sundaram V, Reisslein M, Karam LJ. Objective video quality assessment methods: A classification, review, and performance comparison. IEEE transactions on broadcasting. Feb. 10, 2011;57(2):165-82. (Year: 2011).*

Giannopoulos M, Tsagkatakis G, Blasi S, Toutounchi F, Mouchtaris A, Tsakalides P, Mrak M, Izquierdo E. Convolutional neural networks for video quality assessment. arXiv preprint arXiv:1809.10117. Sep. 26, 2018. (Year: 2018).*

International Search Report and Written Opinion (PCT/ISA/210 & PCT/ISA/237) dated Oct. 8, 2021 by the International Searching Authority in International Application No. PCT/KR2021/008102.

* cited by examiner

VIDEO QUALITY ASSESSMENT METHOD AND APPARATUS

CROSS-REFERENCE TO RELATED APPLICATION(S)

This application is based on and claims priority under 35 U.S.C. § 119 to Korean Patent Application No. 10-2020-0127542, filed on Sep. 29, 2020, in the Korean Intellectual Property Office, the disclosure of which is incorporated by reference herein in its entirety.

BACKGROUND

1. Field

The disclosure relates to a computing apparatus and an operating method thereof, and more particularly, to a computing apparatus for performing video quality assessment by generating training data and training a neural network by using the training data and an operating method thereof.

2. Description of Related Art

Distortion occurs in video images during a process of generation, compression, storage, transmission, and reproduction. Distorted images must be reproduced within an allowable range of human perception. Therefore, before an image is reproduced, it is necessary to quantify and assess the quality in order to understand how this distortion affects the quality to be perceived by humans.

Image quality may be assessed using a subjective quality assessment method and an objective quality assessment method. The subjective quality assessment method may be a method by which an assessor directly watches a video and assesses quality, and may best reflect the quality perception characteristics of humans. However, the subjective quality assessment method has a disadvantage in that a significant amount of time and cost is required, and it is difficult to assess a quality of an image in real time.

The objective quality assessment method is a method of implementing an algorithm that quantifies quality perceived by the human optic nerve and assessing a degree of deterioration in the quality of a compressed image by using the algorithm.

The objective quality assessment method includes a full-reference quality assessment method in which a reference image is compared with a distorted image, a reduced reference quality assessment method in which quality assessment is performed using partial information about the reference image other than the reference image itself such as, for example, watermarking or auxiliary channels, and a no-reference quality assessment method in which quality estimation is performed using only distorted images without using any information of the reference image.

The no-reference quality assessment method does not require reference image information, and therefore may be used in any application requiring quality assessment.

SUMMARY

Provided are a video quality assessment method and an apparatus for obtaining training data for training a neural network that performs a video quality assessment.

Provided are a video quality assessment method and an apparatus for obtaining a corresponding subjective quality assessment score from an objective quality assessment score with respect to an image, and using the image and the subjective quality assessment score as training data.

Provided are a video quality assessment method and an apparatus for obtaining a quality score with respect to an input image by using a trained neural network, and correcting and outputting the input image based on the quality score.

Additional aspects will be set forth in part in the description which follows and, in part, will be apparent from the description, or may be learned by practice of the presented embodiments of the disclosure.

According to an aspect of an example embodiment, an operating method of a computing apparatus may include obtaining a reference image; obtaining a distorted image generated from the reference image; obtaining an objective quality assessment score of the distorted image that is indicative of a quality of the distorted image as assessed by an algorithm, by using the reference image and the distorted image; obtaining a subjective quality assessment score corresponding to the objective quality assessment score; and training a neural network, by using the distorted image and the subjective quality assessment score as a training data set.

The obtaining of the subjective quality assessment score may include obtaining the subjective quality assessment score corresponding to the objective quality assessment score, by using a mapping function representing a relation between the objective quality assessment score and the subjective quality assessment score.

The mapping function may include information related to at least one of screen information of an image display apparatus or an image processing pipeline of the image display apparatus.

The screen information of the image display apparatus may include information related to at least one of a screen resolution or a screen size.

The obtaining of the subjective quality assessment score may include obtaining the subjective quality assessment score, by using a particular mapping function, selected from a plurality of different mapping functions, according to a resolution of an image.

The operating method may include inputting a frame to the trained neural network; and obtaining a quality score with respect to the frame from the trained neural network based on at least one of detail, noise, texture, contrast, gamma, sharpness, color, tint, or blur of the frame.

The computing apparatus may include a plurality of different neural networks trained according to a resolution of an image, and the obtaining of the quality score may include obtaining the quality score, by using a neural network selected from among the plurality of different neural networks according to a resolution of the frame.

The operating method may include post-processing the frame based on the quality score of the frame; and outputting the post-processed frame.

The operating method may include detecting a scene change from frames included in a video; post-processing a group of frames belonging to a same scene, based on the quality score of the group of the frames; and outputting the post-processed group of the frames.

The post-processing may include adaptively performing at least one of noise reduction, detail enhancement, resolution adjustment, or frame rate conversion, based on the quality score.

According to an aspect of an example embodiment, a computing apparatus may include a memory configured to store one or more instructions; and a processor configured to execute the one or more instructions stored in the memory to: obtain a reference image; obtain a distorted image generated from the reference image; obtain an objective quality assessment score of the distorted image, that is indicative of a quality of the distorted image as assessed by an algorithm, by using the reference image and the distorted image; obtain a subjective quality assessment score corresponding to the objective quality assessment score; and train a neural network, by using the distorted image and the subjective quality assessment score as a training data set.

The processor may execute the one or more instructions to obtain the subjective quality assessment score corresponding to the objective quality assessment score, by using a mapping function representing a relation between the objective quality assessment score and the subjective quality assessment score.

The mapping function may include information related to at least one of screen information of an image display apparatus or an image processing pipeline of the image display apparatus.

The screen information of the image display apparatus may include information related to at least one of a screen resolution or a screen size.

The processor may execute the one or more instructions to obtain the subjective quality assessment score, by using a particular mapping function, selected from a plurality of different mapping functions, according to a resolution of an image.

According to an aspect of an example embodiment, an image display apparatus may include a display; a memory configured to store one or more instructions; and a processor configured to execute the one or more instructions stored in the memory to: input a frame to a trained neural network, obtain a quality score with respect to the frame from the trained neural network, post-process the frame based on the quality score of the frame, and provide the post-processed frame for output via the display. The trained neural network may be trained by obtaining a reference image; obtaining a distorted image generated from the reference image; obtaining an objective quality assessment score of the distorted image that identifies a quality of the distorted image as assessed by an algorithm, by using the reference image and the distorted image; obtaining a subjective quality assessment score corresponding to the objective quality assessment score; and training by using the distorted image and the subjective quality assessment score as a training data set.

The image display apparatus may include a plurality of different trained neural networks trained according to a resolution of an image, and the processor may execute the one or more instructions to obtain the quality score, by using a neural network selected from among the plurality of different neural networks according to a resolution of the frame.

The processor may execute the one or more instructions to: detect a scene change from frames included in a video, post-process a group of frames belonging to a same scene based on a quality score of the group of the frames, and provide the post-processed group of the frames for output via the display.

The quality score of the frame may include a score with respect to at least one item of detail, noise, texture, contrast, gamma, sharpness, color, tint, or blur of the frame, and the processor may execute the one or more instructions to perform at least one of noise reduction, detail enhancement, resolution adjustment, or frame rate conversion, based on the score with respect to the at least one item and post-process the group of the frames.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
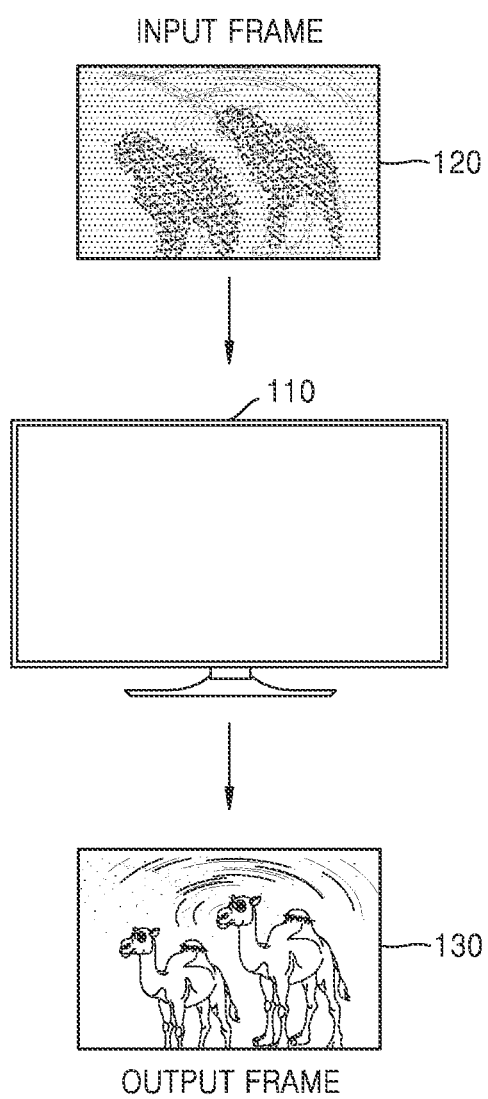
FIG. 1 is a diagram illustrating an image display apparatus assessing a video quality, and outputting an image having a processed quality on a screen, according to an embodiment.

Embodiments will now be described in detail herein with reference to the accompanying drawings. The disclosure may, however, be embodied in many different forms and should not be construed as being limited to the examples set forth herein.

Although general terms widely have been selected for describing the embodiments in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

The terms used in the present specification are merely used to describe particular embodiments, and are not intended to limit the scope of the disclosure.

Throughout the specification, when an element is referred to as being "connected" or "coupled" to another element, it may be directly connected or coupled to the other element, or may be electrically connected or coupled to the other element with intervening elements interposed therebetween.

Throughout the disclosure, the expression "at least one of a, b or c" indicates only a, only b, only c, both a and b, both a and c, both b and c, all of a, b, and c, or variations thereof.

The use of the terms "a" and "an" and "the" and similar referents in the context of describing the disclosure (especially in the context of the following claims) are to be construed to cover both the singular and the plural. Also, the steps of all methods described herein may be performed in any suitable order unless otherwise indicated herein or otherwise clearly contradicted by context. Embodiments are not limited to the described order of the operations.

Thus, the expression "according to an embodiment" used in the entire disclosure does not necessarily indicate the same embodiment.

Embodiments may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a certain function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments, Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The terms "unit", "-er (-or)", and "module," when used in this specification refers to a unit in which at least one function or operation is performed, and may be implemented as hardware, software, or a combination of hardware and software.

The term "user" used herein denotes a person who controls a function or operation of an image display apparatus by using the image display apparatus. Examples of the user may include a viewer, a manager, or an installation engineer.

The disclosure will now be described more fully with reference to the accompanying drawings.

FIG. 1 is a diagram illustrating an image display apparatus 110 assessing a video quality, and outputting an image having a processed quality on a screen, according to an embodiment.

Referring to FIG. 1, the image display apparatus 110 may be an electronic apparatus configured to process and output an image. The image display apparatus 110 may be stationary or mobile, and may be a digital TV configured to receive digital broadcasting, but is not limited thereto, and may be implemented as various types of electronic apparatuses including a display.

The image display apparatus 110 may output a video. The video may be configured as a plurality of frames. The video may include items such as TV programs provided by content providers or various movies or dramas through video on demand (VOD) services. The content provider may mean a terrestrial broadcasting station or cable broadcasting station, an over-the-top (OTT) service provider, an Internet Protocol television (IPTV) service provider that provides various contents including video to consumers, or the like.

The video is captured, compressed, and transmitted to the image display apparatus 110, and is reconstructed and output by the image display apparatus 110. Due to the limitation of the physical characteristic of a device used to capture the video and a limited bandwidth, information is lost, which causes a distortion of the image. The distorted video may deteriorate in quality.

In an embodiment, the image display apparatus 110 may be an example of a video quality assessment apparatus that assesses a video quality. Because the image display apparatus 110 receives the video provided by the content provider and assesses a quality of the received video, the image display apparatus 110 may assess the quality of the video based on only the received video, that is, the distorted video. That is, in an embodiment, because the image display apparatus 110 is not able to use a reference image which is the original image of a distorted image, the image display apparatus 110 may assess the quality of the video by using a no-reference quality assessment method.

The image display apparatus 110 may first assess the quality of the video before outputting an input frame 120 included in the video to a screen.

In an embodiment, the image display apparatus 110 may obtain a quality score of a frame by using an artificial intelligence (AI) technology. The image display apparatus 110 may obtain a model-based quality score with respect to the input frame 120 by using at least one neural network.

The AI technology may include machine learning (deep learning) and element technologies using machine learning. The AI technology may be implemented using an algorithm or a set of algorithms. The neural network may receive input data, perform an operation for analysis and classification, and output result data.

The neural network may include a plurality of internal layers that perform operations. The neural network may obtain different feature maps from the respective layers.

In an embodiment, the neural network used by the image display apparatus 110 may be a previously trained model to perform a video quality assessment.

In an embodiment, the neural network used by the image display apparatus 110 may be previously trained by a computing apparatus. To this end, in an embodiment, the computing apparatus may obtain training data for training the neural network. Obtaining of the training data by the computing apparatus is described in detail with reference to FIGS. 2 to 6.

A manufacturer that manufactures the image display apparatus 110 may have the neural network trained based on the training data obtained by the computing apparatus embedded on the image display apparatus 110.

In an embodiment, the image display apparatus 110 may receive the input frame 120 provided by the content provider, and obtain a quality score with respect to the input frame 120 by using the previously trained neural network.

In an embodiment, the image display apparatus 110 may post-process the input frame 120 based on the quality score with respect to the input frame 120 obtained by the neural network.

In an embodiment, the image display apparatus 110 may perform at least one or more various post-processing methods such as adaptively reducing noise of the input frame 120, enhancing details, upscaling a resolution, or converting a frame rate according to the quality score to correct the input frame 120.

The image display apparatus 110 may output the corrected input frame 120 as an output frame 130 through a display.

As described above, according to an embodiment, the image display apparatus 110 may obtain a quality score with respect to an input image by using the neural network trained with the training data obtained by the computing apparatus.

According to an embodiment, the image display apparatus 110 may post-process the input image in various ways and output the input image based on the quality score.

Figure 2:
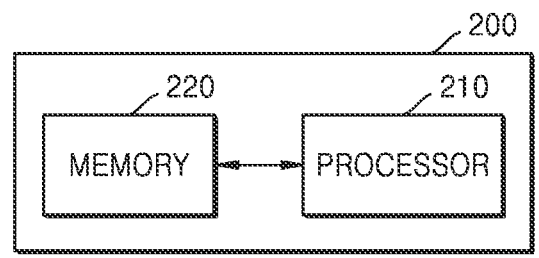
FIG. 2 is a block diagram of an internal structure of a computing apparatus, according to an embodiment.

FIG. 2 is a block diagram of an internal structure of a computing apparatus 200, according to an embodiment.

Referring to FIG. 2, the computing apparatus 200 may include a processor 210 and a memory 220.

In an embodiment, the computing apparatus 200 may obtain training data and use the training data to train a neural network so as to perform a video quality assessment method.

In an embodiment, the computing apparatus 200 may obtain the training data to allow the neural network to perform the video quality assessment method.

In an embodiment, the computing apparatus 200 may be manufactured in the form of at least one hardware chip and embedded on an electronic apparatus, or may be included in a server in the form of a chip or an electronic apparatus. Alternatively, the computing apparatus 200 may be included in the image display apparatus 110, etc. Alternatively, the computing apparatus 200 may be implemented as a software module.

The memory 220 according to an embodiment may store one or more instructions. The memory 220 may store one or more programs executed by the processor 210. In addition, the memory 220 may store data input to or output from the computing apparatus 200.

In an embodiment, the memory 220 may store at least one AI model to be described later. In an embodiment, when there are multiple AI models, the memory 220 may store multiple AI models.

The memory 220 may include at least one type of storage medium selected from among a flash memory type, a hard disk type, a multimedia card micro type, a card type memory (e.g., a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, or an optical disk.

The processor 210 controls the overall operation of the computing apparatus 200. The processor 210 may control the computing apparatus 200 to function by executing the one or more instructions stored in the memory 220.

In an embodiment, the processor 210 may generate a distorted image from a reference image, by executing the one or more instructions. The reference image may mean an image before distorted by a compression or a transmission error.

In an embodiment, the processor 210 may obtain an objective quality assessment score with respect to the distorted image by using the reference image and the distorted image obtained from the reference image.

Objective quality assessment is less accurate than subjective quality assessment because objective quality assessment aims to model a subjective quality assessment mechanism and predict a score. This is because the objective quality assessment method considers only the reference image and relies only on a statistical characteristic of a signal and may not reflect a perceived quality characteristic of a human visual system (HVS) well. In addition, an objective quality assessment result differs from a subjective picture assessment result because various environmental factors are not considered.

The subjective quality assessment method may be the most accurate measurement method for a quality assessment because the subjective quality assessment method is a method of obtaining a score by reflecting perception of a person. However, there are problems that it is difficult for a person to assess an image every time and obtain the subjective quality assessment result, and it takes a lot of time and cost.

In an embodiment, the processor 210 may obtain an objective quality assessment score with respect to an image by using the objective quality assessment method capable of measuring quality at a low cost and time.

In an embodiment, the processor 210 may obtain a subjective quality assessment score corresponding to the objective quality assessment score based on the objective quality assessment score. That is, the processor 210 may not use the objective quality assessment result as training data as it is, but may obtain and use the subjective quality assessment score corresponding to the objective quality assessment result as training data.

In an embodiment, the processor 210 may use a mapping function to obtain the subjective quality assessment score corresponding to the objective quality assessment result.

The mapping function may be a function indicating a relation between an objective quality assessment score with respect to a certain image and a subjective quality assessment score with respect to the certain image. Here, the subjective quality assessment score may be, for example, a mean opinion score (MOS). The MOS is obtained through a subjective assessment of a human, and may mean a mean score obtained by synthesizing individual parameters with respect to a video quality assessed by multiple people.

The processor 210 may obtain the subjective quality assessment result corresponding to the objective quality assessment result obtained with respect to the distorted image by using a previously generated mapping function.

In an embodiment, the processor 210 may use the distorted image and the subjective quality assessment score as a training data set. That is, the processor 210 may label the distorted image with the subjective quality assessment score and use the distorted image and the subjective quality assessment score as the training data set. Labeling is defined from the viewpoint of analyzing a property of data, and a set of labeled data may be used as training data or training data.

In an embodiment, the processor 210 may use the subjective quality assessment score indicating a degree of distortion of the image as a label with respect to the image.

The processor 210 may repeat the above process using a plurality of reference images. That is, the processor 210 may generate a distorted image with respect to each of the plurality of reference images, and obtain the objective quality assessment score by using the reference image and the distorted image. The processor 210 may obtain the subjective quality assessment score corresponding to the objective quality assessment score by using a mapping function, label the reference image with the subjective quality assessment score corresponding to the reference image, and use the labeled image as the training data.

In an embodiment, the mapping function may include information about at least one of screen information of the image display apparatus 110 or an image processing pipeline of the image display apparatus 110. The screen information may include at least one of a screen size or a screen resolution of the image display apparatus 110. The image processing pipeline of the image display apparatus 110 may mean a pipeline that performs a function of decoding, rendering, and outputting an image received from the image display apparatus 110 to the screen. The information about the image processing pipeline may include information about elements included in the pipeline that performs the above function and performance or specification of each element.

In an embodiment, the mapping function may be different according to a resolution of the image. The processor 210 may obtain training data for each resolution by using different mapping functions according to the resolution of the image. The processor 210 may obtain different AI models for each resolution by training the neural network using the training data obtained for each resolution.

In an embodiment, the processor 210 may train the neural network which is an algorithm implementing AI technology using the obtained training data. The neural network may receive input data and output result data. In order for the neural network to accurately output the result data corresponding to the input data, the neural network is trained.

Here, 'training' may mean training a neural network so that the neural network may discover or master by itself a method of inputting various data into the neural network and analyzing the input data, a method of classifying the input data, and/a method of extracting features for generating result data from the input data. Training the neural network means that an AI model having an intended characteristic is generated by applying a learning algorithm to a plurality of pieces of training data. Such learning may be performed in the computing apparatus 200 in the example embodiment, or may be performed through a server/system/apparatus separately from the computing apparatus 200.

Here, the learning algorithm is a method of training a certain target device (e.g., a robot) by using the plurality of pieces of training data and allowing the certain target device to make a decision or make a prediction by itself. Examples of learning algorithms include supervised learning, unsupervised learning, semi-supervised learning, or reinforcement learning, and the learning algorithm in the embodiment is not limited to the above example except where specified.

In an embodiment, the processor 210 may obtain the training data and train an AI model by using the obtained training data. The processor 210 may train the neural network using the labeled image as the training data. When the distorted image is input, the processor 210 may train the neural network to obtain an MOS with respect to the distorted image as a result. The neural network may be trained with an algorithm that obtains the MOS from the distorted image by using the learned data, a set of algorithms, software that executes the set of algorithms, and/or hardware that executes the set of algorithms.

As described above, according to an embodiment, the computing apparatus 200 may obtain a distorted image from a reference image, and obtain an objective quality assessment score with respect to the distorted image by using the reference image and the distorted image. Also, the computing apparatus 200 may obtain a subjective quality assessment score corresponding to the objective quality assessment score by using a mapping function. The computing apparatus 200 may train the neural network by using the distorted image labeled with the subjective quality assessment score as training data.

Figure 3:
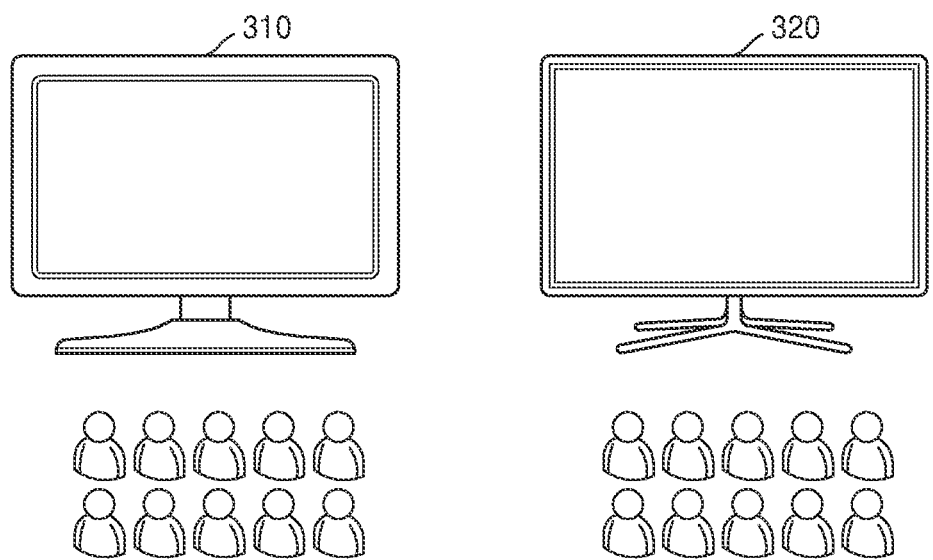
FIG. 3 is a diagram illustrating generating a mapping function differently for each display apparatus, according to an embodiment.

FIG. 3 is a diagram illustrating generating a mapping function differently for each display apparatus, according to an embodiment.

Referring to FIG. 3, a first image display apparatus 310 is shown on the left side, and a second image display apparatus 320 different from the first image display apparatus 310 is shown on the right side.

A plurality of assessors may watch a video by using the first image display apparatus 310 and assess a video quality as a score. Scores assessed by the plurality of assessors may be converted into an MOS. The MOS obtained from the assessors may be used to generate a mapping function. A manufacturer that manufactures the first image display apparatus 310 may generate the mapping function by using an objective quality assessment score obtained with respect to an image and a subjective quality assessment score obtained from the assessors with respect to the same image as the image, i.e., the MOS.

The MOS may be obtained by the assessors assessing the quality of a video by using a single stationary display apparatus. However, a display apparatus used by an actual user or consumer, that is, an image display apparatus, may have different specifications for each display apparatus.

In an embodiment, the mapping function used by the computing apparatus 200 may be different according to a resolution of the screen.

For example, in FIG. 3, it is assumed that screens of the first image display apparatus 310 and the second image display apparatus 320 have different resolutions. Even though screen sizes are the same, when the screen resolutions of the first and second image display apparatuses 310 and 320 are different, MOSs with respect to videos output through the screens having different resolutions may be different. That is, when viewing the video through the first image display apparatus 310 and when viewing the video through the second image display apparatus 320 having a different screen resolution, the assessors may assign different quality scores to the video. This is because, as the resolution increases, the number of pixels included in the screen increases, an image looks clearer, and thus the person's eye may perceive distortion more sensitively.

Obtaining different MOSs according to the resolution of the screen may mean that the MOS obtained through each display apparatus includes resolution information of the screen according to a model of each display apparatus.

In an embodiment, the manufacturer may obtain the MOS for each display apparatus having different screen resolutions and use the MOS to generate the mapping function. That is, the manufacturer may generate a first mapping function by using the MOS obtained through the first image display apparatus 310, and generate a second mapping function by using the MOS obtained through the second image display apparatus 320.

In an embodiment, the computing apparatus 200 may obtain an MOS corresponding to an objective quality assessment score with respect to a distorted image by using the first mapping function, and use the MOS as training data of a neural network to be used in the first image display apparatus 310. The computing apparatus 200 may train the neural network by using the obtained training data set. The trained neural network may be embedded on the first image display apparatus 310.

Similarly, the computing apparatus 200 may obtain an MOS corresponding to an objective quality assessment score with respect to the distorted image by using the second mapping function, and use the MOS as training data of a neural network to be used in the second image display apparatus 320. The computing apparatus 200 may train the neural network by using the training data set. The trained neural network may be embedded on the second image display apparatus 320.

In another embodiment, the mapping function may be generated differently according to an image processing pipeline of a display apparatus.

The display apparatus may process an image by configuring a pipeline by using available resources. The image processing pipeline may mean a process until a signal input to the display apparatus is processed and output from the display apparatus. The display apparatus may include a plurality of resources, depacketize, decode, render, and output an input image on a screen. The image processing pipeline may include, for example, a demultiplexer, a decoder, and a renderer, but is not limited thereto. Resources may be implemented in hardware or software depending on the type. The type or specification of each resource, the number of resources, etc., may vary for each display apparatus. The difference between these resources may affect the quality of an image that is rendered and output.

For example, in FIG. 3, it is assumed that the screens of the first image display apparatus 310 and the second image display apparatus 320 have the same size and the same resolution, but have different image processing pipelines. In this case, a degree of distortion of images output through the first image display apparatus 310 and the second image display apparatus 320 may be different according to the image processing pipelines of the first image display apparatus 310 and the second image display apparatus 320. As a result, MOSs obtained through the first image display apparatus 310 and the second image display apparatus 320 may also differ from each other.

In an embodiment, the computing apparatus 200 may obtain training data by using a different mapping function according to the image processing pipeline of the display apparatus. That is, the computing apparatus 200 may obtain an MOS corresponding to an objective quality assessment score with respect to a distorted image by using a mapping function generated for each display apparatus having different pipelines, and label the distorted image with the obtained MOS, thereby obtaining different training data for each display apparatus.

As described above, according to an embodiment, when obtaining training data, the computing apparatus 200 may use a mapping function in consideration of a screen resolution of each display apparatus or an image processing pipeline, thereby obtaining a subjective quality assessment score in accordance with each display apparatus. The computing apparatus 200 may label the distorted image with the obtained subjective quality assessment score, and train the neural network by using the labeled distorted image as the training data.

Figure 4:
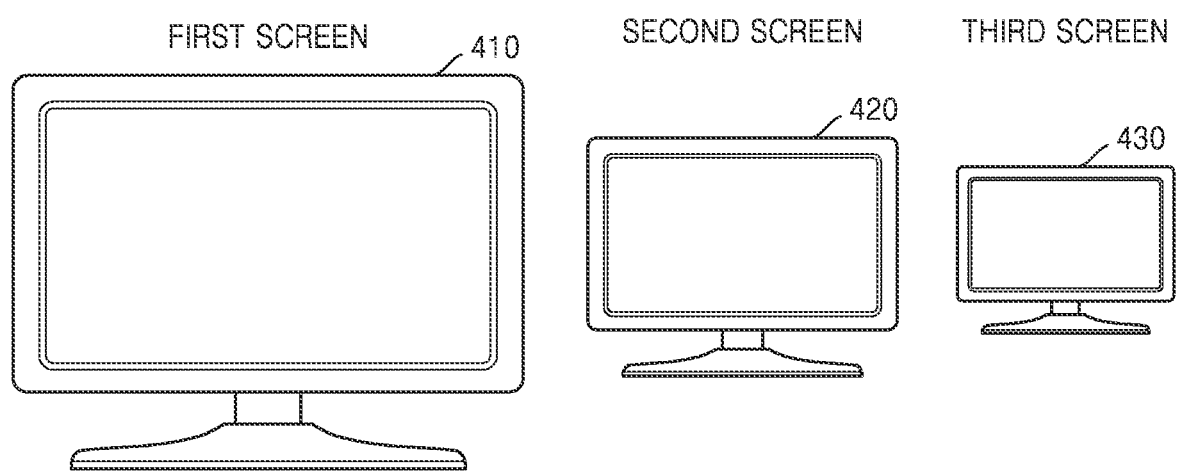
FIG. 4 is a diagram illustrating generating a mapping function differently for each display apparatus, according to an embodiment.

FIG. 4 is a diagram illustrating generating a mapping function differently for each display apparatus, according to an embodiment.

FIG. 4 illustrates image display apparatuses having different screen sizes. Three screens shown in FIG. 4 have large sizes in the order of a first screen 410, a second screen 420, and a third screen 430.

In general, when a size of a screen is equal to or larger than a certain size, a person tends to watch a video mainly on a partial area of the screen, but in contrast, when the size of the screen is not large, the person tends to view the entire area of the screen at once. In addition, a degree to which the person perceives a distortion included in a video when viewing the video may vary according to the size of the screen. That is, even though there is the same distortion, the degree to which the person perceives the distortion may vary according to the size of the screen.

In an embodiment, a manufacturer may generate a mapping function in consideration of the size of the screen. That is, when a plurality of assessors calculates a video quality score by using a display apparatus, the manufacturer may obtain an MOS by using each of display apparatuses having different screen sizes, and generate different mapping functions according to each screen size by using the obtained MOS. The manufacturer may obtain the MOS from the assessors through each of the first screen 410, the second screen 420, and the third screen 430, and generate a mapping function in accordance with each of the first screen 410, the second screen 420, and the third screen 430 using the obtained MOS through each of the first screen 410, the second screen 420, and the third screen 430.

Obtaining different MOSs according to the size of the screen may mean that an MOS obtained through each display apparatus includes information about a screen size of each display apparatus.

The computing apparatus 200 may generate training data of a neural network to be used in the display apparatus having each screen size by using the mapping function generated for each screen size.

As described above, according to an embodiment, when obtaining training data, the computing apparatus 200 may obtain a subjective quality assessment score with respect to a distorted image by using a mapping function in consideration of the screen size of each display apparatus. The computing apparatus 200 may label a distorted image with the obtained subjective quality assessment score, and train the neural network by using the labeled distorted image as the training data.

Figure 5:
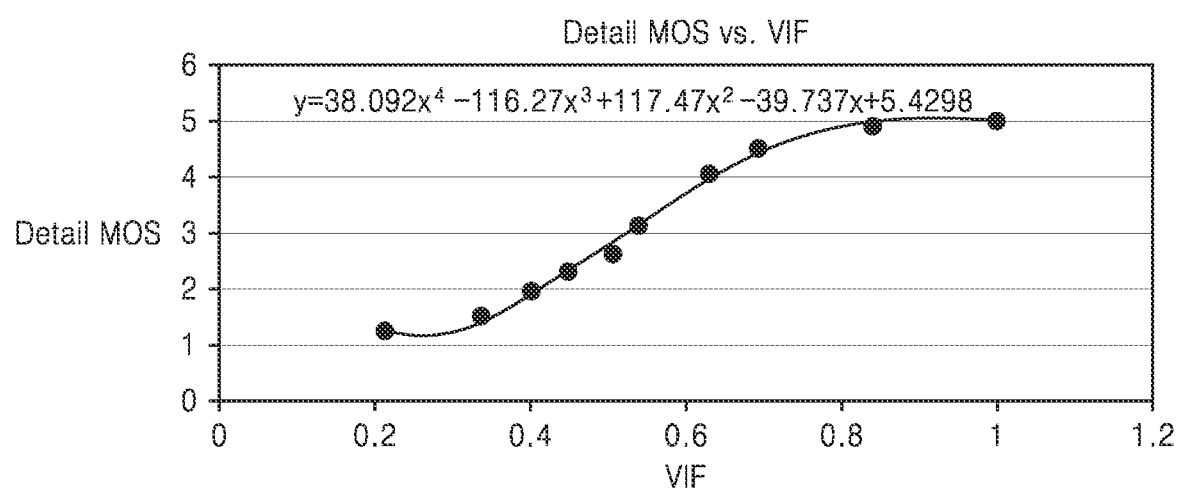
FIG. 5 is a diagram illustrating a mapping function, according to an embodiment.

FIG. 5 is a diagram illustrating a mapping function, according to an embodiment.

In FIG. 5, a horizontal axis represents a score obtained through a metric called visual information fidelity (VIF) among objective quality assessment methods. In FIG. 5, the VIF has a value from 0 to 1, when the VIF is 0, an image may have the most severe distortion, and when the VIF is 1, the image may have no distortion.

In FIG. 5, a vertical axis represents a subjective quality assessment score, that is, an MOS. The MOS has a value from 1 to 5, when the MOS is 1, a quality score may be the lowest, and when the MOS is 5, the quality score may be the highest.

In FIG. 5, the mapping function may represent a relationship between an objective quality assessment score and a subjective quality assessment score. The computing apparatus 200 may generate a distorted image by applying a distortion to a reference image, and obtain a residual between two images by comparing the reference image and the distorted image by using a full-reference quality assessment method. The computing apparatus 200 may obtain an objective quality assessment score with respect to the distorted image by using the residual between the two images.

A manufacturer may obtain an MOS of assessors with respect to the same distorted image. The manufacturer may use an electronic apparatus to generate a curve fitting connecting an objective quality assessment score and a subjective quality assessment score obtained with respect to the same image. Curve fitting may mean approximating and representing raw data as a function. Curve fitting may be generated by approximating raw data with no special regularity to a function with a tendency.

In FIG. 5, the manufacturer may obtain a polynomial that approximates a relations between values on two axes as the mapping function, by using raw data of the objective quality assessment score, that is, the VIF, as an x value, and raw data of the subjective quality assessment score, that is, the MOS, as a y value.

The manufacturer may generate a mapping function in accordance with the specification of each display apparatus. That is, the manufacturer may allow assessors to assess a video by using a display apparatus that is to include a neural network, thereby obtaining an MOS reflecting information about at least one of a screen resolution and a screen size of the display apparatus or an image processing pipeline of the display apparatus. The manufacturer may generate a mapping function in accordance with the corresponding display apparatus by using the MOS obtained from the corresponding display apparatus together with the objective quality assessment score obtained by the computing apparatus 200.

The computing apparatus 200 may obtain a training data set by using the mapping function. The computing apparatus 200 may obtain a subjective quality assessment score corresponding to the objective quality assessment score with respect to the distorted image by using the mapping function.

As described above, by using the mapping function, the computing apparatus 200 may obtain the subjective quality assessment score that is automatically mapped to the objective quality assessment score without obtaining an MOS with respect to the distorted image from assessors each time.

The computing apparatus 200 may obtain the training data set by labeling the distorted image with the subjective quality assessment score, and train a neural network through the obtained training data set.

In an embodiment, when generating the mapping function, the manufacturer may generate different mapping functions for each resolution of an input image.

When assessors view images of different resolutions through screens of the same specification, assessment scores given by the assessors with respect to the images having different resolutions may vary. That is, when the same image is output in different resolutions such as high definition (HD), full HD (FHD), and ultra HD (UHD), an assessment score with respect to an HD image may be different from an assessment score with respect to an UHD image. This is because noise included in the image may also be different because methods of compressing and transmitting the image are different according to the resolution. In addition, because the images having different resolutions may have different details, assessment results with respect to the images may vary according to the resolution.

In consideration of this, the manufacturer may allow the assessors to assess videos having different resolutions such as, for example, HD, FHD, and UHD resolutions, thereby obtaining different MOSs for each video resolution. The manufacturer may generate different mapping functions for each image resolution based on different MOSs with respect to the videos having respective resolutions.

The computing apparatus 200 may obtain a subjective quality assessment score corresponding to an objective quality assessment score with respect to a corresponding image by using different mapping functions generated for each resolution of the image. The computing apparatus 200 may obtain an image and a subjective quality assessment score with respect to the image as a data set for each resolution of the image.

When the neural network is trained by using different data sets for each resolution, values of nodes included in the neural network may be trained to have different weights. In this case, different neural networks or different AI models may be generated for each resolution.

The neural network for each resolution generated by the computing apparatus 200 may be included in the image display apparatus 110.

When an image is input, the image display apparatus 110 may select a neural network in accordance with a resolution of the input image and obtain a quality score corresponding to the input image by using the selected neural network.

Figure 6:
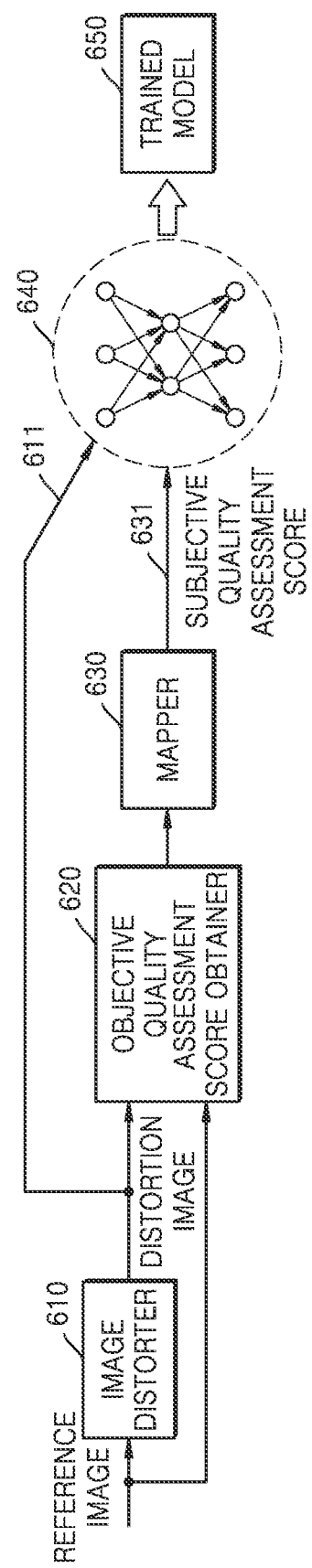
FIG. 6 is a diagram illustrating obtaining training data and obtaining a trained model by using the training data, according to an embodiment.

FIG. 6 is a diagram illustrating obtaining training data and obtaining a trained model by using the training data, according to an embodiment.

Referring to FIG. 6, the processor 210 included in the computing apparatus 200 of FIG. 2 may include an image distorter 610, an objective quality assessment score obtainer 620, and a mapper 630 according to functions performed by the image distorter 610, the objective quality assessment score obtainer 620, and the mapper 630.

The image distorter 610 may distort a reference image to various types and/or various levels to generate a distorted image 611.

The image distorter 610 may generate the distorted image 611 from a reference image by using various methods such as Joint Photographic Experts Group (JPEG) compression, a Gaussian blur, Gaussian noise, etc.

JPEG is an image file format, and JPEG compression may be a compression method using a lossy compression technology. The person's eye is sensitive to the overall structural loss of an image related to a low frequency component, but is relatively insensitive to change in details related to a high frequency component. JPEG is a lossy compression method of reducing, using this property, the size of the original file by removing some of high frequency components of an image.

The Gaussian blur is a method of adding blur to an image, and may apply blur to the image by convolving a weighted Gaussian kernel with the image. The Gaussian kernel is an array of square pixels having weights corresponding to values of a Gaussian curve, and is multiplied by each pixel of the image. The weight of each pixel of the image is changed according to values of peripheral pixels through the Gaussian kernel, and edge components forming an outline are removed to have an overall smoothing effect.

The Gaussian noise is a method of distorting an image by adding noise having the same probability density function as a normal distribution which is also called a Gaussian distribution to the image.

The image distorter 610 may distort the image by using various methods in addition to the above-described methods. The image distorter 610 may distort the image by combining one or a plurality of image distortion methods.

The distorted image 611 synthesized by the image distorter 610 may be input to the objective quality assessment score obtainer 620.

The objective quality assessment score obtainer 620 may perform objective quality assessment on the distorted image 611 by using a reference image and the distorted image 611. Objective quality assessment is a method of predicting a result of subjective quality assessment, and is a technology that implements an algorithm that measures a perceived quality by the human optic nerve. The objective quality assessment score obtainer 620 may perform objective quality assessment on the distorted image 611 in various ways.

For example, the objective quality assessment score obtainer 620 may assess distortion of the image by using various metrics such as a Mean-Squared Error (MSE), Peak Signal-to-Noise Ratio (PSNR), Structural SIMilarity (SSIM), VIF, Visual Signal-to-Noise ratio (VSNR), Information Fidelity Criterion (IFC), etc. The objective quality assessment score obtainer 620 may obtain an objective quality assessment score with respect to the distorted image 611 from the reference image and the distorted image 611 with respect to the reference image by using one metric or a combination of two or more metrics.

A mapping function is stored in the mapper 630. The mapping function may be a function obtained by approximating an objective quality assessment score and a subjective quality assessment score obtained by performing an objective quality assessment method and a subjective quality assessment method on the same image, respectively.

The mapper 630 may include different mapping functions according to the screen size or the screen resolution of the display apparatus, and the image processing pipeline specification of the display apparatus. In addition, the mapper 630 may include the mapping function to be applied to the objective quality assessment score with respect to the image for each resolution of the input image.

The mapper 630 may select an appropriate mapping function and apply the objective quality assessment score with respect to the distorted image 611 received from the objective quality assessment score obtainer 620 to the selected mapping function to obtain a subjective quality assessment score 631 corresponding to the objective quality assessment score.

The distorted image 611 generated by the image distorter 610 and the subjective quality assessment score 631 obtained by the mapper 630 may be used as training data for training a neural network 640.

Here, a trained model 650 may be a trained neural network itself that enables obtaining a wanted result through the neural network 640.

In order to obtain a quality assessment score, the neural network 640 may be trained with a plurality of learning images. Training of the neural network 640 may mean setting values of a plurality of weights respectively applied to a plurality of nodes forming the neural network 640. Here, the weight may mean connection strength between the nodes of the neural network 640. The weight value may be optimized through repetitive learning, and may be corrected repeatedly until the accuracy of a result satisfies a certain reliability. The trained model 650 may be a neural network formed by finally set weight values.

According to an embodiment, an operation of learning a method of detecting a quality assessment from the distorted image 611 by using the one or more neural networks 640 may be performed in advance before the trained model 650 is embedded on the image display apparatus 110. When some of a plurality of learning images are changed, the trained model 650 may also be updated. When a new learning image is used or added in a certain periodic unit, the neural network 640 may be trained with the method of detecting the quality assessment from the new image again, and accordingly, the trained model 650 may be updated.

In an embodiment, an operation of learning a method of obtaining a quality assessment score from the distorted image 611 by using the one or more neural networks 640 may be performed by the computing apparatus 200. The operation of learning the method of obtaining the quality assessment score from the distorted image 611 by using the one or more neural networks 640 may require a relatively complex amount of computation. Accordingly, the computing apparatus 200 may perform the learning operation, and the image display apparatus 110 may receive the trained model 650 from the computing apparatus 200 through a communication network, and thus the amount of computation that needs to be performed in the image display apparatus 110 may be reduced.

The image display apparatus 100 may receive the trained model 650 from a server in which the computing apparatus 200 is stored, store the trained model 650 in a memory, and obtain the quality assessment score from the image by using the stored trained model 650.

Alternatively, a manufacturer manufacturing the image display apparatus 110 may have the trained model 650 trained by the computing apparatus 200 embedded on the image display apparatus 110 so that the trained model 650 can be used by the image display apparatus 110 to obtain a quality score.

Alternatively, in another embodiment, other than the computing apparatus 200, the image display apparatus 110 may directly perform a learning operation through the neural network 640. In this case, the image display apparatus 110 may obtain training data, train the neural network 640 with the training data to determine the trained model 650, and obtain the quality assessment score with respect to the image through the determined trained model 650.

Figure 7:
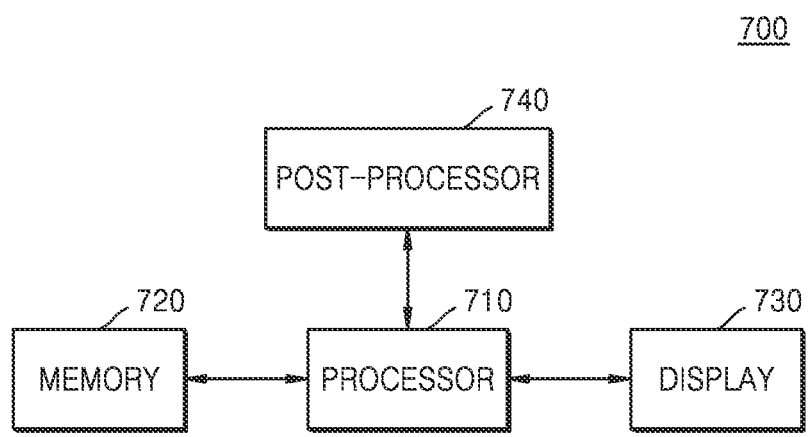
FIG. 7 is a block diagram of an internal structure of an image display apparatus, according to an embodiment.

FIG. 7 is a block diagram of an internal structure of an image display apparatus 700, according to an embodiment.

Referring to FIG. 7, the image display apparatus 700 may include a processor 710, a memory 720, a display 730, and a post-processor 740. The image display apparatus 700 of FIG. 7 may be an example of the image display apparatus 110 illustrated in FIG. 1.

The image display apparatus 700 may include at least one of a digital TV, a desktop personal computer (PC), a smartphone, a tablet PC, a mobile phone, a video phone, an e-book reader, a laptop PC, a netbook computer, a digital camera, personal digital assistants (PDAs), a portable multimedia player (PMP), a camcorder, a navigation device, a wearable device, a smart watch, a home network system, a security system, or a medical device.

The image display apparatus 700 may be implemented not only as a flat display apparatus, but also as a curved display apparatus which is a screen having a curvature, or a flexible display apparatus capable of adjusting a curvature. The output resolution of the image display apparatus 700 may include, for example, HD, FHD, UHD, or a resolution that is clearer than UHD.

The memory 720 according to an embodiment may store one or more instructions. The memory 720 may store data input to the image display apparatus 700 or output from the image display apparatus 700.

The memory 720 may include at least one type of storage medium selected from among a flash memory type, a hard disk type, a multimedia card micro type, a card type memory (e.g., a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, or an optical disk.

The memory 720 may store one or more programs executed by the processor 710. At least one neural network and/or a predefined operation rule or an AI model may be stored in the memory 720. In an embodiment, a neural network that performs quality assessment on an image may be stored in the memory 720. Here, the neural network that performs quality assessment may be a neural network that is generated in accordance with the image display apparatus 700.

As described above, a manufacturer may generate a mapping function that reflects information about at least one of a screen resolution and a screen size of the image display apparatus 700 or an image processing pipeline of the image display apparatus 700. The computing apparatus 200 may obtain a training data set by using a mapping function in accordance with the image display apparatus 700 and may train the neural network by using the obtained training data set. The trained neural network may be included in the memory 720 or the processor 710 in the image display apparatus 700 and may be used to obtain a quality score of a video.

In an embodiment, the memory 720 may store a plurality of neural networks applied for each resolution of an image. The manufacturer may generate different mapping functions for each resolution of an image. That is, the manufacturer may allow assessors to assess videos of different resolutions, thereby obtaining an MOS for each resolution of a video and generating the mapping function. The computing apparatus 200 may obtain different training data sets for each resolution of an image by using different mapping functions for each resolution of the image, and train neural networks by using different training data sets. Different trained models trained with different training data sets may be stored in the memory 720.

The processor 710 controls the overall operation of the image display apparatus 700. The processor 710 may control the image display apparatus 700 to function by executing the one or more instructions stored in the memory 720.

The processor 710 may measure a quality of a corresponding video before outputting a broadcast program received in real time or a program of a VOD service received by streaming or downloading on a screen.

In an embodiment, other than the memory 720, the processor 710 may store at least one neural network that performs quality assessment and/or a predefined operation rule or an AI model.

In another embodiment, the image display apparatus 700 may further include a neural network processor, which is a separate dedicated processor that performs an operation of obtaining a quality score through a neural network. In this case, a neural network for performing quality assessment may be stored in the neural network processor. The neural network processor may obtain the quality score with respect to an input image by using the neural network that performs quality assessment.

The processor 710 may perform quality assessment on a video including a plurality of frames by using the neural network. In an embodiment, the processor 710 may obtain a quality score for each entire frame unit, or divide a frame into a plurality of sub-areas and obtain a model-based quality score for each sub-area.

In an embodiment, the post-processor 740 may correct the image based on the model-based quality score with respect to the image. Correcting of the image based on the obtained quality score may mean performing post-processing for each frame by correcting a post-processing setting value in a frame unit. The post-processor 740 may perform one of or a combination of two or more of various post-processing methods such as adaptively reducing noise of the frame, enhancing details, upscaling a resolution, or converting a frame rate according to the quality score to correct the frame.

The display 730 according to an embodiment may output the corrected frame and the video.

When the display 730 is implemented as a touch screen, the display 730 may be used as an input device as well as an output device. For example, the display 730 may include at least one of a liquid crystal display (LCD), a thin film transistor-liquid crystal display (TFT-LCD), an organic light-emitting diode (OLED), a flexible display, a three-dimensional (3D) display, or an electrophoretic display. In addition, according to embodiments of the image display apparatus 700, the image display apparatus 700 may include two or more displays 730.

As described above, according to an embodiment, the image display apparatus 700 may obtain a quality score with respect to an input frame by using at least one neural network and post-process each frame or a group of multiple frames by using the quality score. The image display apparatus 700 may output the video with improved quality through the display 730.

Figure 8:
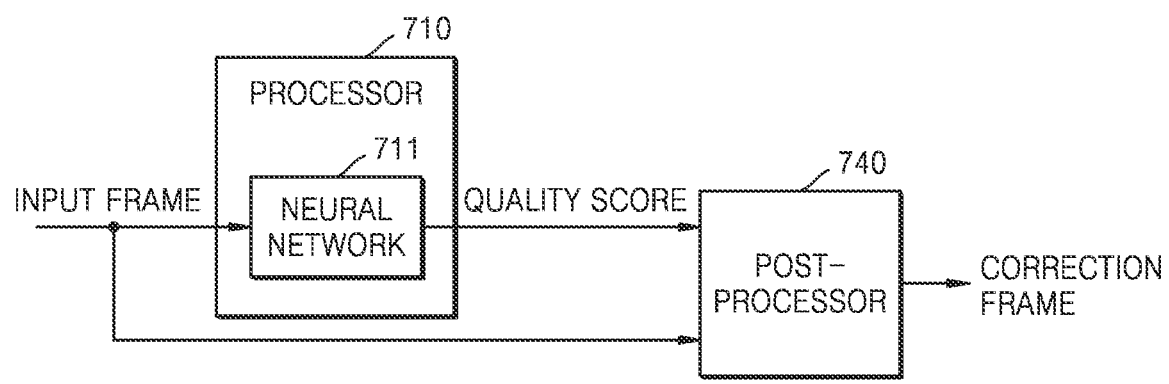
FIG. 8 is a block diagram of a part of an internal structure of the image display apparatus of FIG. 7, according to an embodiment.

FIG. 8 is a block diagram of a part of an internal structure of the image display apparatus 700 of FIG. 7, according to an embodiment.

Referring to FIG. 8, the processor 710 may include a neural network 711.

FIG. 8 illustrates that the neural network 711 is included in the processor 710, but this is an embodiment. The neural network 711 may be stored in the memory 720 in the image display apparatus 700 or neural network processor in the image display apparatus 700.

A manufacturer may generate a mapping function in consideration of the specification of each display apparatus. The manufacturer may allow assessors to watch a video by using the image display apparatus 700, so that a screen resolution or a screen size of the image display apparatus 700, and image processing pipeline information of the image display apparatus 700 are reflected on an MOS. The manufacturer may generate the mapping function in accordance with the image display apparatus 700 by using the MOS obtained through the image display apparatus 700 together with an objective quality assessment score with respect to an image.

The computing apparatus 200 may obtain a subjective quality assessment score of the image by using the mapping function in accordance with the image display apparatus 700, and obtain the image labeled with the subjective quality assessment score as a training data set.

In an embodiment, the neural network 711 may be trained with the training data set obtained by the computing apparatus 200. In an embodiment, the neural network 711 may be trained to analyze and classify input data and extract a quality assessment score of the image from the input data.

The neural network 711 may be an algorithm for extracting features from the input data, a set of algorithms, software that executes the set of algorithms, and/or hardware that executes the set of algorithms. The neural network 711 may be a deep neural network (DNN) including two or more hidden layers. The neural network 711 may include a structure in which input data is processed by passing through hidden layers such that the processed data is output. Each layer of the neural network 711 is represented by one or more nodes, and nodes between layers are connected by edges.

In the image display apparatus 700, the neural network 711 may obtain a quality score from an input frame and transmit the quality score to the post-processor 740.

In an embodiment, the post-processor 740 may receive the input frame and the quality score with respect to the input frame, and post-process the input frame based on the quality score.

In an embodiment, the post-processor 740 may adaptively post-process the input frame according to the quality score.

The post-processor 740 may improve a quality of the frame by removing noise included in the frame, or may improve the quality of the frame by more clearly correcting details included in the frame. Alternatively, the post-processor 740 may combine several images to generate a high-resolution image with a high resolution, or may improve the quality of the frame by adjusting frame per second (FPS).

Figure 9:
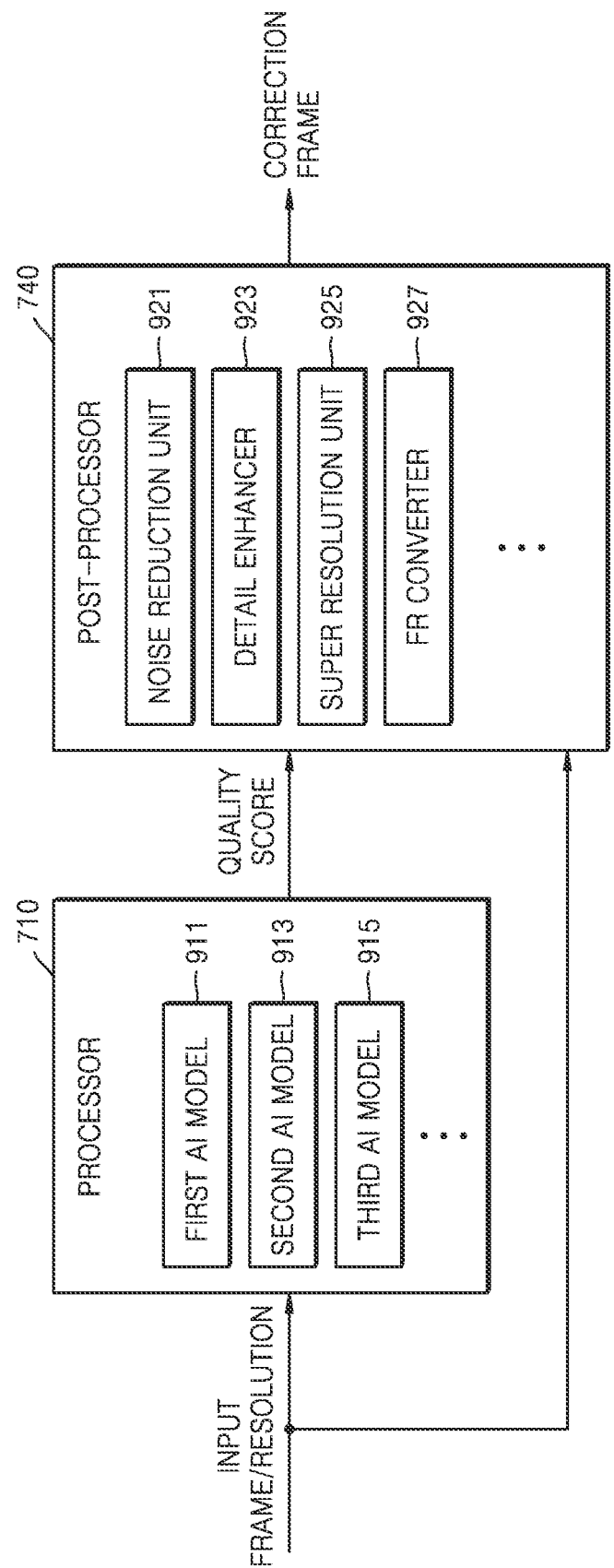
FIG. 9 is a block diagram of a part of an internal structure of the image display apparatus of FIG. 7, according to an embodiment.

FIG. 9 is a block diagram of a part of an internal structure of the image display apparatus 700 of FIG. 7, according to an embodiment.

The processor 710 of FIG. 9 may be an embodiment of the processor 710 of FIG. 8.

Because images with different resolutions have different noise or details, assessment scores of assessors for each resolution may also vary. That is, when the same image has different resolutions, an MOS with respect to each image mapped to a VIF value may be different.

In an embodiment, the image display apparatus 700 may include neural networks trained with different training data sets generated using different mapping curves for each resolution of an image.

In FIG. 9, the image display apparatus 700 may include different neural networks, that is, a first AI model 911, a second AI model 913, and a third AI model 915, but is limited thereto. The image display apparatus 700 may include more AI models for each resolution.

The resolution of a video received by the image display apparatus 700 may be determined in various ways. In an embodiment, the processor 710 may select an AI model in accordance with the resolution of the received video from among a plurality of AI models, and obtain a quality assessment score with respect to a frame included in the video by using the selected AI model.

In FIG. 9, the image display apparatus 700 may receive a video including a plurality of frames. The image display apparatus 700 may receive resolution information of the video together with the video or separately from the video.

The processor 710 may receive the frame and the resolution information and determine which neural network to use according to the resolution of the received video. When the resolution of the frame is a first resolution, the processor 710 may input the frame to the first AI model 911 to obtain a quality score for each frame of the video. Similarly, the processor 710 may input a frame having a second resolution to the second AI model 913 and input a frame having a third resolution to the third AI model 915 to obtain the quality score for each frame of the video.

In an embodiment, the quality score obtained from the AI model may include scores for various factors that affect the quality of an image. For example, the quality score may include scores for various items such as detail, noise, texture, contrast, gamma, sharpness, color, tint, blur, etc., of each image.

Images may be classified based on the quality score obtained from the AI model. That is, the images are classified according to the quality score for each item obtained from the neural network, and thus a type of post-processing to be performed on the corresponding image may be different.

In FIG. 9, the post-processor 740 may be an example of the post-processor 740 of FIG. 8.

In an embodiment, the post-processor 740 may post-process the input frame based on the quality score and the resolution information of the frame obtained from the processor 710.

As described above, the quality of the frame such as noise or detail may vary according to the resolution of the frame.

Accordingly, the post-processor 940 may perform post-processing in accordance with the frame by using the resolution information of the corresponding frame together with the quality score of each frame.

The post-processor 740 may include a noise reducer 921, a detail enhancer 923, a super resolution unit 925, and a frame rate (FR) converter 927. However, this is an embodiment, and in addition to the above-described elements, various elements for improving quality by processing an image may be further added to the post-processor 740, or some of these elements may be excluded.

The noise reducer 921 may improve image quality by performing noise reduction on various noise included in the image. Various noise such as Gaussian Noise, Salt and Pepper Noise, Shot Noise, and Uniform Noise may be generated in the image, which may deteriorate the quality of the image. Such noise may be generated by an image sensor that captures the image, or may be generated in a video compression operation or a video editing operation.

The noise reducer 921 may remove noise through a convolution operation based on a spatial area. The convolution operation may mean a method of determining a value of each pixel by using one filter such as 3×3 or 5×5. Alternatively, the noise reducer 921 may remove noise due to an irregular factor of an image that changes over time by using a time filter. The noise reducer 921 may remove noise from the image by using various filters such as a Median Filter, an Average Filter, a Gaussian Filter, etc., according to the type of noise.

The detail enhancer 923 may perform detail enhancement by clearly correcting blurry details included in the image. The detail enhancer 923 may decompose the image into a base layer representing an overall feature and a detail layer representing fine details or fine textures. The detail layer may be boosted/scaled and then combined with the base layer. In the detail enhancement, an image may be processed on a pixel basis in a spatial domain or an image may be processed in a frequency domain through a Fourier transform.

The super resolution unit 925 may generate a clear image by combining a plurality of blurred images by using a super resolution technology that generates a high-resolution image by using a plurality of low-resolution images. The super resolution technology may also be referred to as an upscaling technology. The super resolution unit 925 may elaborately expand a horizontal and vertical ratio in a display configured as pixels to output a video of an improved quality. For example, the super resolution unit 925 may upscale an image of FHD resolution having 1920×1080 pixels and expand the horizontal×vertical resolution by two times so that the upscaled image may be displayed on a display of an image display apparatus of a 4K-UHD resolution having 3840×2160 pixels.

The FR converter 927 may improve image quality by adjusting an FPS of image data. For example, in case where the FPS of the image display apparatus that outputs the image data is greater than the FPS of the image data, because the image quality deteriorates when the received image data is transmitted as it is, the image display apparatus is required to increase the FPS and improve the image quality. The FR converter 927 may perform frame interpolation or frame synthesis to increase the number of frames per second. The FR converter 927 may perform frame interpolation or frame synthesis to reconstruct a damaged or missing frame, or generate a new frame between frames to smooth an image to improve video quality.

In an embodiment, at least one of the elements included in the post-processor 740 may be implemented using a neural network. The neural network that implements the elements included in the post-processor 740 may be a neural network that performs post-processing, different from a neural network that obtains a quality score of a frame. The noise reducer 921, the detail enhancer 923, the super resolution unit 925, and the FR converter 927 included in the post-processor 740 may respectively perform corresponding functions by using neural networks for performing different post-processing.

For example, the noise reducer 921 included in the post-processor 740 may be implemented using a neural network that reduces noise. In this case, the neural network used by the noise reducer 921 may an algorithm trained to analyze and classify input data, that is, a quality score for each item, extract features of the input data, and obtain an image from which noise is removed from the features, or a set of algorithms, software that executes the set of algorithms, and/or hardware that executes the set of algorithms.

Similarly, the detail enhancer 923 included in the post-processor 740 may be implemented using a neural network that enhances a detail. In this case, the neural network used by the detail enhancer 923 may be software and/or hardware that executes an algorithm trained to receive a quality score for each item of the image as input data, analyze and classify the input data, and obtain an image with an enhanced detail.

The post-processor 740 may correct the image by using any one of the elements included in the post-processor 740 or by using two or more elements together.

In an embodiment, the processor 710 may determine which and how much post-processing is to be performed on a corresponding image based on a quality score for each item of the image and a resolution of the image. The processor 710 may control the post-processor 740 so that the elements included in the post-processor 740 adaptively correct the image based on scores of various elements with respect to the image.

For example, with respect to an image having a high detail score among quality scores of the image, when the detail enhancer 923 further enhances the detail, an edge area of the original clear image may be enhanced so that the image may be corrected to feel artificial. As another example, when an image having a high noise score is processed by the detail enhancer 923, because noise is also boosted, the quality of the image may not be improved. As another example, when the detail score of the image is low and the noise score is high, the quality of the image may be improved by performing noise reduction on the image with a high gain.

In an embodiment, based on the quality score for each item of the image and the resolution of the image, the processor 710 may determine how the post-processor 740 post-processes the corresponding image and to what degree of intensity the post-processor 740 post-processes the corresponding image.

The post-processor 740 may post-process the image at a determined intensity by using an element to perform a determined post-processing method among the elements included in the post-processor 740 under the control by the processor 710.

For example, when the detail score of the image is 3 and the noise score is 4, the processor 710 may control the post-processor 740 so that the noise reducer 921 may reduce noise at an intensity of 8, the detail enhancer 923 may reinforce the detail at an intensity of 4, and the super resolution unit 925 may perform scaling at a normal degree.

The input frame may be adaptively post-processed by the post-processor 740, and the post-processed frame may be output through the display 730 as a correction frame.

As described above, according to an embodiment, the image display apparatus 700 may obtain a quality score of an image by using different models for each resolution of the image.

According to an embodiment, the quality score of the image may include quality scores for various items that affect the quality score.

According to an embodiment, the image display apparatus 700 may improve the quality of the image in an optimal way by adaptively performing post-processing on a corresponding image based on the quality score for each item of the image.

Figure 10:
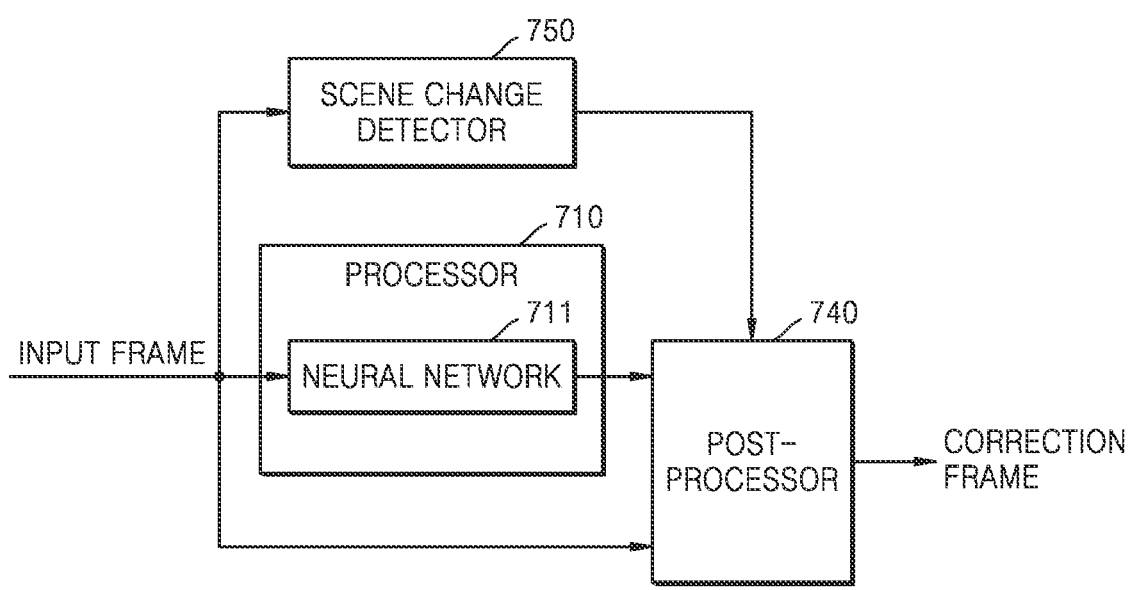
FIG. 10 is a block diagram of a part of an internal structure of the image display apparatus of FIG. 7, according to an embodiment.

FIG. 10 is a block diagram of a part of an internal structure of the image display apparatus 700 of FIG. 7, according to an embodiment.

Referring to FIG. 10, the image display apparatus 700 may further include a scene change detector 750.

The post-processor 740 may receive a quality score with respect to an input frame from the neural network 711 and perform post-processing on the frame.

The processor 710 may determine a post-processing operation to be performed through the post-processor 740 based on the quality score of the frame. In this regard, the processor 710 may control the post-processor 740 to perform different post-processing operations with respect to each frame based on a quality score with respect to each item for each frame. However, when the processor 710 adaptively controls the post-processor 740 for all frames, it may take a considerable amount of time to control the post-processor 740.

In an embodiment, the post-processor 740 does not adaptively perform post-processing with respect to all frames, but may perform post-processing in the same manner with respect to frames belonging to the same scene. This is because frames corresponding to the same scene have a high degree of similarity between the frames, and thus image correction may be performed in the same manner with respect to the frames.

In an embodiment, the scene change detector 750 may capture the frame before the frame is output on a screen. The scene change detector 750 may capture a frame every certain time. For example, the scene change detector 750 may capture a frame input to the neural network 711 every 0.5 seconds. Alternatively, the scene change detector 750 may continuously capture every frame input to the neural network 711.

The scene change detector 750 may determine whether there is a scene change in the captured frame. When the scene change is detected in the captured frame, the scene change detector 750 may generate an identifier such as a flag or a bit indicating that the scene change is detected in the corresponding frame. The scene change detector 750 may transmit the identifier to the post-processor 740 when the scene change is detected. Alternatively, the scene change detector 750 may inform the processor 710 of the identifier when the scene change is detected.

In an embodiment, when receiving the identifier from the scene change detector 750, the post-processor 740 or the processor 710 may identify that the scene change is detected in the corresponding frame. The post-processor 740 may perform the same post-processing operation with respect to the frames belonging to the same scene. For example, when the post-processor 740 identifies the frame with the scene change, the post-processor 740 may perform the same post-processing operation with respect to the frames from the corresponding frame until a next flag is received, that is, until a next scene change is detected.

As described above, according to the example embodiment, the image display apparatus 700 performs the same correction with respect to the frames belonging to the same scene, thereby reducing the time required to adaptively perform post-processing according to a quality score of the image.

Figure 11:
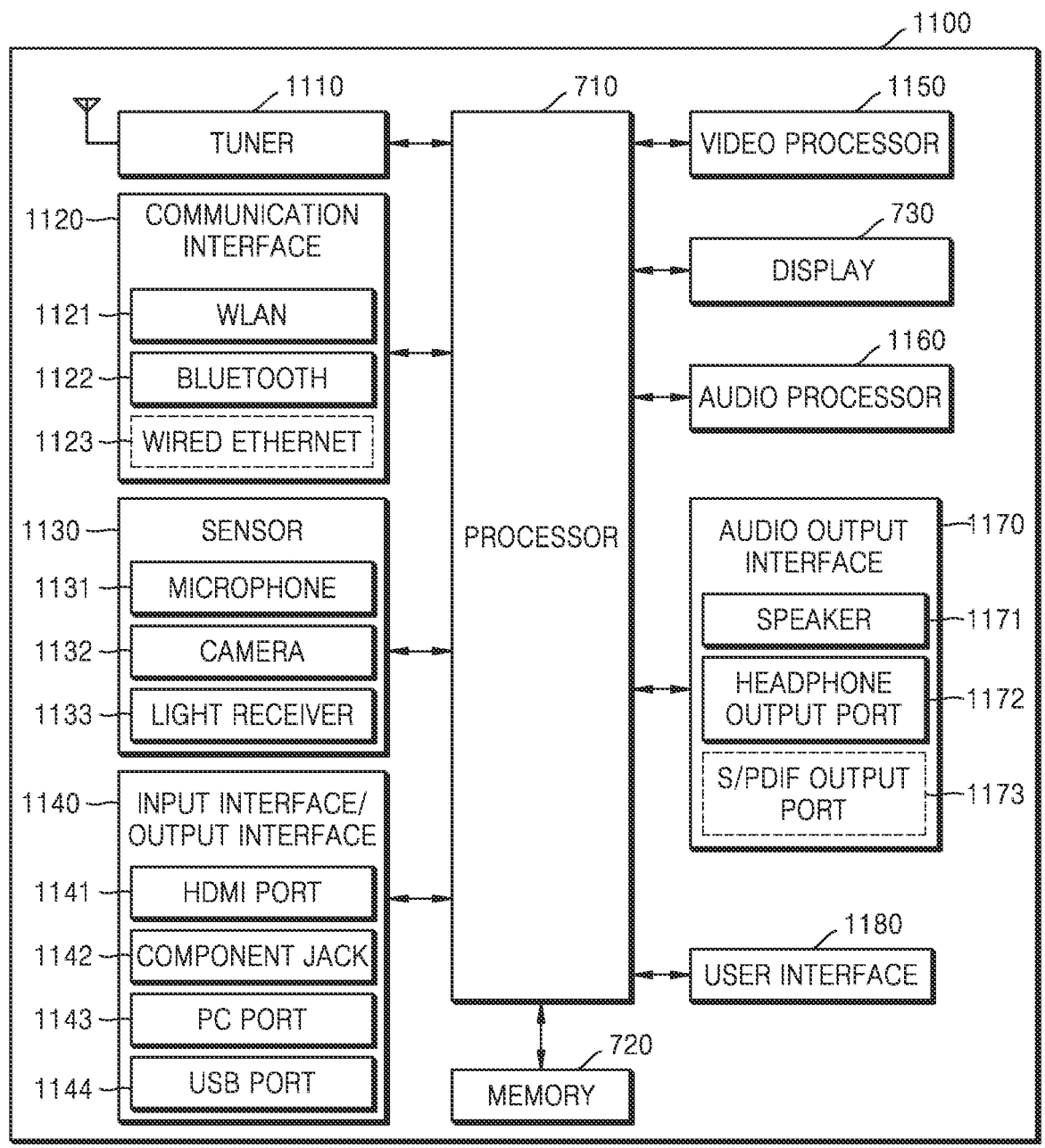
FIG. 11 is a block diagram of an internal structure of an image display apparatus, according to an embodiment.

FIG. 11 is a block diagram of an internal structure of an image display apparatus 1100, according to an embodiment.

The image display apparatus 1100 of FIG. 11 may include elements of the image display apparatus 700 of FIG. 7.

Referring to FIG. 11, the image display apparatus 1100 may include a tuner 1110, a communication interface 1120, a sensor 1130, an input interface/output interface 1140, a video processor 1150, an audio processor 1160, an audio output interface 1170, and a user interface 1180, in addition to the processor 710, the memory 720, and the display 730.

The tuner 1110 may tune and select only a frequency of a channel which the image display apparatus 1100 wants to receive from among many radio wave components that are obtained via amplification, mixing, resonance, or the like of wired or wireless broadcasting content. The content received via the tuner 1110 is decoded and divided into audio, video, and/or additional information. The audio, the video, and/or the additional information may be stored in the memory 720 under the control by the processor 710.

The communication interface 1120 may connect the image display apparatus 1100 to an external apparatus or a server under the control by the processor 710. The image display apparatus 1100 may download or web-browse a program or application needed by the image display apparatus 1100 from the external apparatus or the server through the communication interface 1120. The communication interface 1120 may receive content from the external apparatus.

The communication interface 1120 may include at least one of a wireless local area network (LAN) 1121, a Bluetooth 1122, or a wired Ethernet 1123 in correspondence to a performance and a structure of the image display apparatus 1100. The communication interface 1120 may receive a control signal via a control apparatus such as a remote controller, under the control by the processor 710. The control signal may be implemented as a Bluetooth signal, a radio frequency (RF) signal, or a Wi-Fi signal. The communication interface 1120 may further include short-range communication (e.g., near field communication (NFC) or Bluetooth low energy (BLE)), in addition to the Bluetooth 1122. According to an embodiment, the communication interface 1120 may transmit or receive a connection signal to or from the external apparatus or the like through short-range communication such as the Bluetooth 1122 or BLE.

The sensor 1130 may sense a voice of a user, an image of the user, or an interaction with the user, and may include a microphone 1131, a camera 1132, and a light receiver 1133. The microphone 1131 may receive an uttered voice of a user, transform the received voice into an electrical signal, and output the electrical signal to the processor 710. The camera 1132 may include a sensor and a lens and may capture an image formed on a screen. The light receiver 1133 may receive an optical signal (including a control signal). The light receiver 1133 may receive an optical signal corresponding to a user input (e.g., touch, pressing, a touch gesture, a voice, or a motion) from a control apparatus such as a remote controller or a mobile phone. A control signal may be extracted from the received optical signal under control by the processor 710.

The input interface/output interface 1140 may receive video (e.g., a moving picture signal or a still image signal), audio (e.g., a voice signal or a music signal), and additional information such as metadata from a device, or the like, external to image display apparatus 1100 under the control by the processor 710. The metadata may include HDR information about content, a description of content or a content title on the content, a content storage location, and the like. The input interface/output interface 1140 may include one of a High-Definition Multimedia Interface (HDMI) port 1141, a component jack 1142, a PC port 1143, and a USB port 1144. The input interface/output interface 1440 may include a combination of the HDMI port 1141, the component jack 1142, the PC port 1143, and the USB port 1144.

The video processor 1150 may process image data that is to be displayed by the display 730, and perform various image processing operations such as decoding, rendering, scaling, noise filtering, frame rate conversion, and resolution conversion, on the image data.

In an embodiment, the video processor 1150 may also perform a function of the post processor 740 of FIG. 7. That is, the video processor 1150 may adaptively post-process a quality of a video and/or frame based on a score for each frame or quality scores of a plurality of frames belonging to the same scene.

The display 730 may output, on the screen thereof, content received from a broadcasting station or received from an external server or an external storage medium. The content is a media signal, and may include a video signal, an image, a text signal, and the like. The display 730 may display a video signal or an image received via the HDMI port 1141, on the screen thereof.

In an embodiment, when the video processor 1150 improves the quality of the video or the frame, the display 730 may output the video or the frame of the improved quality.

When the display 730 is implemented as a touch screen, the display 730 may be used as an input device other than an output device. According to embodiments of the image display apparatus 1100, the image display apparatus 1100 may include two or more displays 730.

The audio processor 1160 processes audio data. The audio processor 1160 may perform a variety of processing such as decoding, amplification, or noise filtering, on the audio data.

The audio output unit 1170 may output audio included in the content received via the tuner 1110, audio that is input via the communication interface 1120 or the input interface/output interface 1140, and audio stored in the memory 720, under the control by the processor 710. The audio output unit 1170 may include at least one of a speaker 1171, a headphone output terminal 1172, or a Sony/Philips Digital Interface (S/PDIF) output terminal 1173.

The user interface 1180 may receive a user input for controlling the image display apparatus 1100.

The user interface 1180 may include various types of user input devices including a touch panel that senses a tough of a user, a button that receives a push manipulation of the user, a wheel that receives a rotation manipulation of the user, a key board, a dome switch, a microphone for voice recognition, and a motion detection sensor, but is not limited thereto. In addition, when the image display apparatus 1100 is manipulated by a remote controller, the user interface 1180 may receive a control signal from the remote controller.

Figure 12:
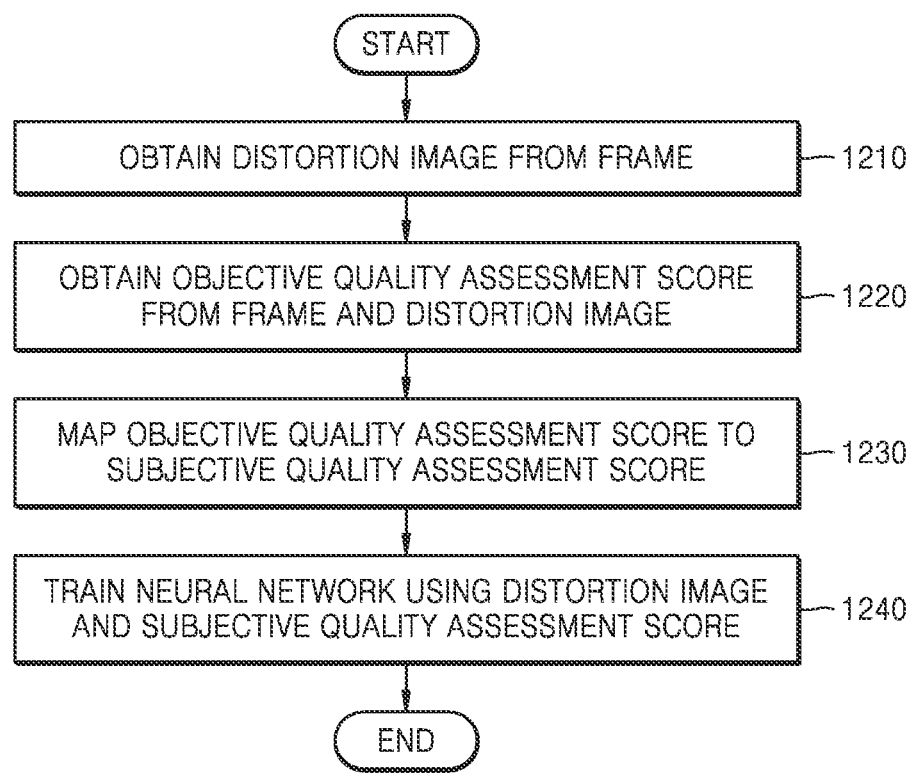
FIG. 12 is a flowchart illustrating a process of training a neural network, according to an embodiment.

FIG. 12 is a flowchart illustrating a process of training a neural network, according to an embodiment.

Referring to FIG. 12, the computing apparatus 200 may obtain a distorted image by distorting a frame (operation 1210). The computing apparatus 200 may distort an image by using a lossy compression technology such as JPEG compression, or various methods such as Gaussian blur or Gaussian noise.

The computing apparatus 200 may obtain an objective quality assessment score with respect to the distorted image by using the frame and the distorted image with respect to the frame (operation 1220). The computing apparatus 200 may obtain a residual between the frame and the distorted image with respect to the frame, and based on the residual, obtain the objective quality assessment score with respect to the distorted image by using various objective quality assessment methods.

The computing apparatus 200 may map the objective quality assessment score with respect to the distorted image to a subjective quality assessment score (operation 1230). The computing apparatus 200 may obtain the subjective quality assessment score corresponding to the objective quality assessment score with respect to the distorted image by using a previously generated mapping function.

The mapping function may be a function representing a relation between an objective quality assessment score with respect to a certain image and a subjective quality assessment score with respect to the same certain image. The mapping function may be generated by reflecting information about at least one of a screen size or a screen resolution of a display apparatus, or a pipeline of the display apparatus.

The mapping function may be generated for each resolution of an image. The computing apparatus 200 may obtain the subjective quality assessment score corresponding to the objective quality assessment score with respect to the distorted image for each resolution by using the mapping function generated for each resolution.

The computing apparatus 200 may train a neural network by using the distorted image and the subjective quality assessment score (operation 1240). The computing apparatus 200 may label the distorted image with the subjective quality assessment score and use the distorted image as a training data set. The computing apparatus 200 may train the neural network to obtain a quality score from the neural network when the image is input using the training data set.

The computing apparatus 200 may generate different trained models for each resolution by using the training data set obtained for each resolution.

Figure 13:
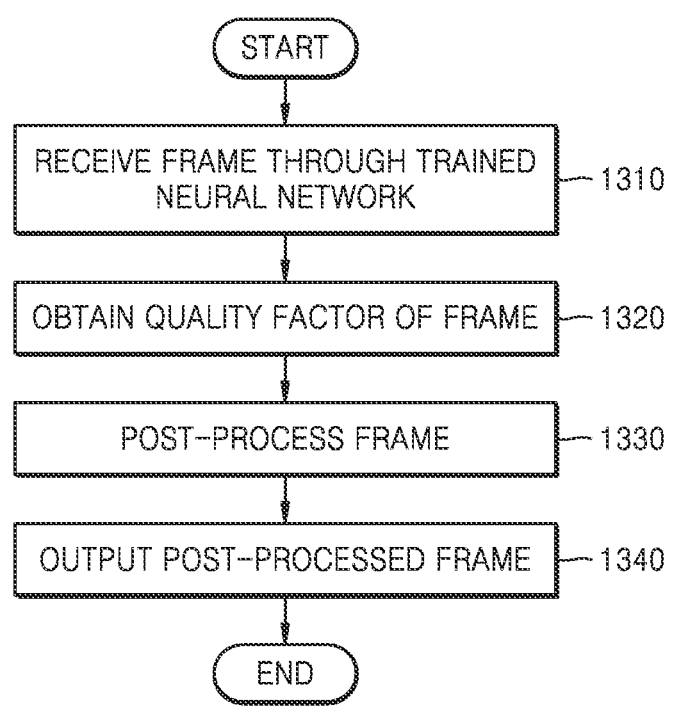
FIG. 13 is a flowchart illustrating a method, performed by an image display apparatus, of outputting an image, according to an embodiment.

FIG. 13 is a flowchart illustrating a method, performed by the image display apparatus 700, of outputting an image, according to an embodiment.

Referring to FIG. 13, the image display apparatus 700 may receive a frame through a trained neural network (operation 1310). The image display apparatus 700 may obtain a model-based quality score with respect to an input frame by using a neural network (operation 1320).

The image display apparatus 700 may obtain a quality score by using different AI models according to a resolution of the input frame.

The image display apparatus 700 may obtain a score with respect to at least one of various items such as detail, noise, texture, contrast, gamma, sharpness, color, tint or blur with respect to the input frame.

The image display apparatus 700 may post-process the frame based on the obtained quality score for each item (operation 1330).

The image display apparatus 700 may perform one or more post-processing operations of noise reduction, detail enhancement, super resolution processing, and frame rate conversion.

The image display apparatus 700 may adaptively determine a type of post-processing and a degree of post-processing to be performed on a corresponding frame according to the obtained quality score for each item. The image display apparatus 700 may perform post-processing on the frame according to the determined type and degree of post-processing, and output the post-processed frame (operation 1340).

The video quality assessment method and apparatus according to some embodiments may be embodied as a storage medium including instruction codes executable by a computer such as a program module executed by the computer. A non-transitory computer-readable medium may be any available medium which may be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal, or other transmission mechanism, and includes any information transmission medium.

The terminology "~unit" used herein may be a hardware component such as a processor or a circuit, and/or a software component that is executed by a hardware component such as a processor.

The video quality assessment method and apparatus according to the above-described embodiments may be implemented as computer program products including a recording medium having stored therein a program for performing an operating method of a computing apparatus including obtaining an objective quality assessment score with respect to a distorted image, by using a reference image and the distorted image obtained from the reference image, obtaining a subjective quality assessment score corresponding to the objective quality assessment score with respect to the distorted image, and training a neural network, by using the distorted image and the subjective quality assessment score as a training data set.

The video quality assessment method and apparatus according to an embodiment may obtain training data for training a neural network that performs a video quality assessment.

The video quality assessment method and apparatus according to an embodiment may obtain a subjective quality assessment score from an objective quality assessment score with respect to an image, and use the image and the subjective quality assessment score as training data.

The video quality assessment method and apparatus according to embodiments of the disclosure may obtain a quality score with respect to an input image, by using a trained neural network.

The video quality assessment method and apparatus according to an embodiments of the disclosure may correct and output an input image based on a quality score with respect to an input image obtained using a trained neural network.

Although embodiments have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

What is claimed is:

1. An operating method of a computing apparatus, the operating method comprising:
    obtaining a reference image;
    obtaining a distorted image generated from the reference image;
    obtaining an objective quality assessment score of the distorted image that is indicative of a quality of the distorted image as assessed by an algorithm, by using the reference image and the distorted image;
    obtaining a subjective quality assessment score corresponding to the objective quality assessment score; and
    training a neural network, by using the distorted image and the subjective quality assessment score as a training data set.

2. The operating method of claim 1, wherein the obtaining of the subjective quality assessment score comprises obtaining the subjective quality assessment score corresponding to the objective quality assessment score, by using a mapping function representing a relation between the objective quality assessment score and the subjective quality assessment score.

3. The operating method of claim 2, wherein the mapping function comprises information related to at least one of screen information of an image display apparatus or an image processing pipeline of the image display apparatus.

4. The operating method of claim 3, wherein the screen information of the image display apparatus comprises information related to at least one of a screen resolution or a screen size.

5. The operating method of claim 2, wherein the obtaining of the subjective quality assessment score comprises obtaining the subjective quality assessment score, by using a particular mapping function, selected from a plurality of different mapping functions, according to a resolution of an image.

6. The operating method of claim 5, further comprising:
    inputting a frame to the trained neural network; and
    obtaining a quality score with respect to the frame from the trained neural network based on at least one of detail, noise, texture, contrast, gamma, sharpness, color, tint, or blur of the frame.

7. The operating method of claim 6, wherein the computing apparatus comprises a plurality of different neural networks trained according to a resolution of an image, and
    wherein the obtaining of the quality score comprises obtaining the quality score, by using a neural network selected from among the plurality of different neural networks according to a resolution of the frame.

8. The operating method of claim 6, further comprising:
    post-processing the frame based on the quality score of the frame; and
    outputting the post-processed frame.

9. The operating method of claim 6, further comprising:
    detecting a scene change from frames included in a video;
    post-processing a group of frames belonging to a same scene, based on the quality score of the group of the frames; and
    outputting the post-processed group of the frames.

10. The operating method of claim 8, wherein the post-processing comprises adaptively performing at least one of noise reduction, detail enhancement, resolution adjustment, or frame rate conversion, based on the quality score.

11. A computing apparatus comprising:
    a memory configured to store one or more instructions; and
    a processor configured to execute the one or more instructions stored in the memory to:
        obtain a reference image;
        obtain a distorted image generated from the reference image;
        obtain an objective quality assessment score of the distorted image, that is indicative of a quality of the distorted image as assessed by an algorithm, by using the reference image and the distorted image;
        obtain a subjective quality assessment score, that is indicative of a quality of the distorted image as assessed by a human, corresponding to the objective quality assessment score; and
        train a neural network, by using the distorted image and the subjective quality assessment score as a training data set.

12. The computing apparatus of claim 11, wherein the processor is further configured to execute the one or more instructions to obtain the subjective quality assessment score corresponding to the objective quality assessment score, by using a mapping function representing a relation between the objective quality assessment score and the subjective quality assessment score.

13. The computing apparatus of claim 12, wherein the mapping function comprises information related to at least one of screen information of an image display apparatus or an image processing pipeline of the image display apparatus.

14. The computing apparatus of claim 13, wherein the screen information of the image display apparatus comprises information related to at least one of a screen resolution or a screen size.

15. The computing apparatus of claim 12, wherein the processor is configured to execute the one or more instructions to obtain the subjective quality assessment score, by using a particular mapping function, selected from a plurality of different mapping functions, according to a resolution of an image.

16. An image display apparatus comprising:
    a display;
    a memory configured to store one or more instructions; and
    a processor configured to execute the one or more instructions stored in the memory to:
        input a frame to a trained neural network,
        obtain a quality score with respect to the frame from the trained neural network,
        post-process the frame based on the quality score of the frame, and
        provide the post-processed frame for output via the display,
        wherein the trained neural network is trained by obtaining a reference image; obtaining a distorted image generated from the reference image; obtaining an objective quality assessment score of the distorted image that identifies a quality of the distorted image as assessed by an algorithm, by using the reference image and the distorted image; obtaining a subjective quality assessment score corresponding to the objective quality assessment score; and training by using the distorted image and the subjective quality assessment score as a training data set.

17. The image display apparatus of claim 16, wherein the image display apparatus comprises a plurality of different trained neural networks trained according to a resolution of an image, and wherein the processor is further configured to execute the one or more instructions to obtain the quality score, by using a neural network selected from among the plurality of different trained neural networks according to a resolution of the frame.

18. The image display apparatus of claim 16, wherein the processor is further configured to execute the one or more instructions to:

detect a scene change from frames included in a video,
post-process a group of frames belonging to a same scene based on a quality score of the group of the frames, and
provide the post-processed group of the frames for output via the display.

19. The image display apparatus of claim 16, wherein the quality score of the frame comprises a score with respect to at least one item of detail, noise, texture, contrast, gamma, sharpness, color, tint, or blur of the frame, and wherein the processor is further configured to execute the one or more instructions to perform at least one of noise reduction, detail enhancement, resolution adjustment, or frame rate conversion, based on the score with respect to the at least one item and post-process the group of the frames.

\* \* \* \* \*